May 9, 1933.    R. N. VAN BUSKIRK    1,908,465
BRAKE OPERATING MEANS
Filed Aug. 27, 1931

*INVENTOR.*
ROBERT N. VAN BUSKIRK
BY
*O. H. Fowler*
*ATTORNEY.*

Patented May 9, 1933

1,908,465

UNITED STATES PATENT OFFICE

ROBERT N. VAN BUSKIRK, OF DETROIT, MICHIGAN, ASSIGNOR TO BENDIX BRAKE COMPANY, OF SOUTH BEND, INDIANA, A CORPORATION OF ILLINOIS

BRAKE-OPERATING MEANS

Application filed August 27, 1931. Serial No. 559,727.

This invention relates to brakes and the like, and is illustrated as embodied in a novel operating device for an internal expanding automobile brake.

An object of the invention is to provide a simple but strong and effective adjustment, preferably acting on the operating device.

In one desirable arrangement, a lever is turned on the camshaft or its equivalent to make the adjustment, the shaft having adjoining sections on one of which the lever is loosely mounted and on the other of which is a connecting device keyed or otherwise non-rotatably mounted on the shaft, and which is provided with teeth or the like interlocking with the lever. A novel threaded device may be provided to bind the assembly together lengthwise of the shaft to preserve the adjustment.

The above and other objects and features of the invention, including various novel combination of parts and desirable details of construction, will be apparent from the following description of the illustrative embodiments shown in the accompanying drawing, in which.

Figure 1:
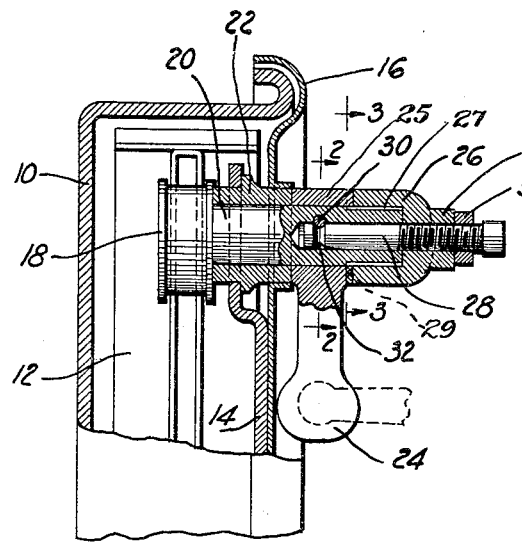
Figure 1 is a partial vertical section through the upper part of a brake, showing the novel operating mechanism.
Figures 2, 3:
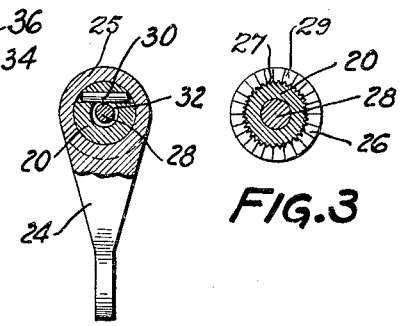
Figure 2 is a section through the shaft and lever on the line 2—2 of Figure 1.
Figure 3 is a section through the shaft on the line 3—3 of Figure 1.

In the arrangement of Figures 1-3, the brake includes a rotatable drum 10, within which are the shoes 12 or equivalent friction means, and at the open side of which is a pressed steel support or backing plate 14 to which a dust plate 16 may be secured.

The brake is applied by means such as a cam 18, shown integral with an operating cam-shaft 20. Shaft 20, according to an important minor feature of the invention, is journaled in a bearing or bracket 22 seated in openings in the backing plate 41 and dust plate 16 and riveted (see Figure 4) to the backing plate.

Shaft 20 is turned, to apply the brake, by novel adjustable means which in Figures 1-4 is shown as including a lever 24 having a hub 25 loosely embracing a portion of the shaft, and a connecting device 26 which is internally serrated at 27 and which embraces a serrated portion of the shaft adjoining the portion embraced by the hub of the lever. Thus the connector 26 is keyed to shaft 20.

Connector 26 and one end of the hub of lever 24 are formed with intermeshing teeth 29 which, when in engagement, lock the lever to the shaft in adjusted position. These teeth are normally held in engagement by a locking member 28 extending into an axial recess in shaft 20 and cross-keyed to the shaft 20 by a pin or key 30 carried by the shaft and received in an annular groove 32. Key 30 permits the locking member 28 to be turned, but prevents it from moving axially with respect to the shaft.

The member 28 is threaded through the end of connector 26, and since the connector cannot turn with respect to the shaft while member 28 can so turn, the turning of member 28 (which may have a polygonal head to receive a wrench) will move connector 26 axially to move its teeth out of and into engagement with the teeth of lever 24. Locknuts 34 or the like normally prevent the turning of member 28.

Figure 4:
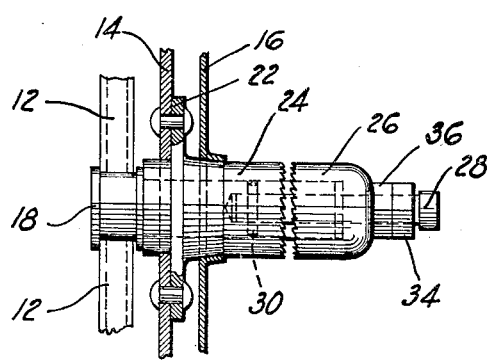
Figure 4 is a top plan view of the mechanism of Figure 1, but with the adjustment loosened.

When connector 26 is moved, by turning member 28, to the position shown in Figure 4, with its teeth out of engagement with lever 24, the lever can be turned on the shaft to the desired adjusted position, whereupon member 28 is turned to the opposite direction to bring the teeth into engagement again, thus again locking lever 24 to the shaft in its adjusted position. Locknuts 34 are then again tightened. A squared portion 36 on connector 26 permits gripping with a wrench to turn shaft 20, when desired.

Figure 5:
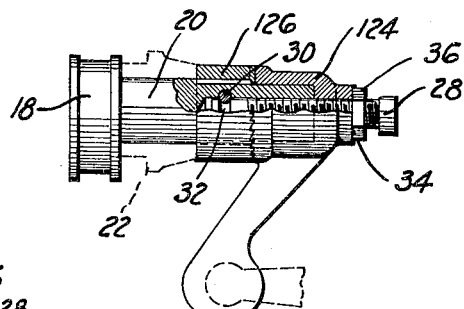
Figure 5 is a sectional view of a modified form of mechanism, corresponding to part of Figure 1.

In Figure 5, the relative positions of connector 126 and lever 124 are reversed with respect to the relative positions of lever 24 and connector 26 in Figure 1.

Figure 6:
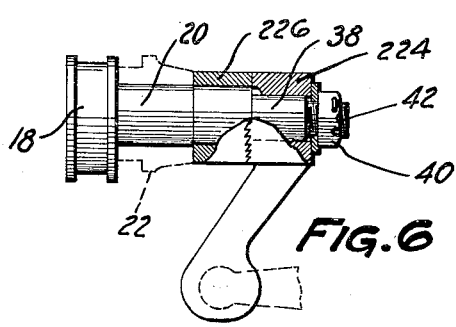
Figure 6 is a sectional view, corresponding to Figure 4, but showing a third form of mechanism.

Figure 6 shows shaft 20 squared instead of serrated, to key connector 226 to the shaft, while lever 224 is merely sleeved on a portion 38 of the shaft, of somewhat smaller diameter than the squared portion. A nut 40 on a threaded small-diameter extension 42 of the shaft, normally holds the teeth of lever 224 and connector 226 in engagement with each other.

While three modifications have been described in detail, it is not my intention to limit the scope of the invention to those particular embodiments, or otherwise than by the terms of the appended claims.

I claim:

1. Operating means comprising, in combination, a shaft having an axial recess in its end, a connector member keyed to the shaft, a lever member having a hub sleeved on the shaft, the two members having interengaging teeth, a member extending into said recess in the shaft and prevented from axial movement while permitted to turn with respect to the shaft and which has threaded engagement with one of said members to move it axially of the shaft to carry said teeth into and out of engagement, and means for locking said member.

2. Operating means comprising, in combination, a shaft having an axial recess in its end, a connector member keyed to the shaft, a lever member having a hub sleeved on the shaft, the two members having interengaging teeth, and a member extending into said recess in the shaft and prevented from axial movement while permitted to turn with respect to the shaft and which has threaded engagement with one of said members to move it axially of the shaft to carry said teeth into and out of engagement.

3. Operating means comprising, in combination, a shaft having an axial recess in its end, a connector member keyed to the shaft, a lever member having a hub sleeved on the shaft, the two members having interengaging teeth, and a member extending into said recess in the shaft and prevented from axial movement while permitted to turn with respect to the shaft and which has threaded engagement with said connector member to move it axially of the shaft to carry said teeth into and out of engagement.

4. Operating means comprising, in combination, a shaft having an axial recess in its end, a connector member keyed to the shaft, a lever member having a hub sleeved on the shaft, the two members having interengaging teeth and a member extending into said recess in the shaft and prevented from axial movement while permitted to turn with respect to the shaft and which has threaded engagement with said lever member to move it axially of the shaft to carry said teeth into and out of engagement.

5. Operating means comprising, in combination, a shaft having an axial recess in one end, a locking member extending into said recess and formed adjacent its end within the recess with an annular groove, and a cross pin carried by the shaft and extending into the groove to prevent movement of said member axially of the shaft.

In testimony whereof, I have hereunto signed my name.

ROBERT N. VAN BUSKIRK.